United States Patent
Sperry et al.

[11] Patent Number: 5,995,723
[45] Date of Patent: Nov. 30, 1999

[54] CLIENT SUBSYSTEM FOR CHANGING DOCUMENT/JOB ATTRIBUTES IN A NETWORK PRINTING SYSTEM

[75] Inventors: Robert H. Sperry, Pittsford; Anthony E. Audi, Rochester, both of N.Y.; Luke E. Burgess, Greenville, S.C.; Mitsuhiro Kajitani, Fairport; Kiyoshi Kamishima, Webster, both of N.Y.

[73] Assignee: Xerox Corporation, Stamford, Conn.

[21] Appl. No.: 08/972,911

[22] Filed: Nov. 18, 1997

[51] Int. Cl.$^6$ ............................................ G06F 15/00
[52] U.S. Cl. ................................. 395/114; 395/112
[58] Field of Search ............................. 395/101, 106, 395/112, 114, 117, 800, 672, 677; 358/501, 400, 401, 403, 407, 442, 443, 452; 345/418, 433, 112, 153, 154, 523; 347/101, 104

[56] References Cited

U.S. PATENT DOCUMENTS

| | | | |
|---|---|---|---|
| 5,220,674 | 6/1993 | Morgan et al. | 395/800 |
| 5,450,571 | 9/1995 | Rosekrans et al. | 395/500.45 |
| 5,467,434 | 11/1995 | Hower, Jr. et al. | 395/114 |
| 5,566,278 | 10/1996 | Patel et al. | 395/114 |
| 5,613,045 | 3/1997 | Morimoto et al. | 395/102 |
| 5,659,795 | 8/1997 | Duvall et al. | 710/15 |
| 5,699,494 | 12/1997 | Colbert et al. | 395/114 |
| 5,699,495 | 12/1997 | Snipp | 395/114 |
| 5,727,135 | 3/1998 | Webb et al. | 395/113 |
| 5,845,058 | 12/1998 | Shaw et al. | 395/114 |
| 5,857,064 | 1/1999 | deSilva | 395/112 |

OTHER PUBLICATIONS

Document Processing Architecture (DPA) ISO/IEC 10175, using the name "Palladium Print System" using the following subsystems to obtain a print service: (1) Print Clients; (2) Print Spoolers; (3) Printer Supervisors; and (4) Printers.

Primary Examiner—David K. Moore
Assistant Examiner—Gabriel I. Garcia
Attorney, Agent, or Firm—Gary B. Cohen; Paul F. Daebeler

[57] ABSTRACT

A client subsystem is provided for use with a network printing system including a client communicating with one or more of a plurality of print-related devices by way of a network connection. An electronic document is developed at the client and placed into a printable format with a print driver. The electronic document in the printable format includes a set of attributes respectively corresponding with a set of attribute values, the set of attribute values controlling a manner in which the electronic document is to be processed at a selected one of the plurality of print-related devices. The client subsystem includes a document routing system, communicating with the print driver and a spooler, for facilitating transmission of the electronic document in the printable format from the print driver to the spooler. A print assistant, communicating with the document routing system, changes the set of attribute values, independently of the print driver, when at least a portion of the electronic document in the printable format has been routed to the spooler by the document routing system. The set of attribute values is finalized at the spooler when the user indicates that the job is ready to be printed, at which point the job submission is completed.

15 Claims, 7 Drawing Sheets

CLIENT SUBSYSTEM FOR CHANGING DOCUMENT/JOB ATTRIBUTES IN A NETWORK PRINTING SYSTEM

BACKGROUND AND MATERIAL DISCLOSURE STATEMENT

The present invention relates generally to a network printing system and, more particularly, to a subsystem for print job submission. The invention permits the changing of an attribute set, associated with a job or one or more documents contained within the job, subsequent to compilation of the one or more documents with a print driver.

In network printing systems, client workstations ("clients") are communicatively coupled with printers by way of a network server. As shown in U.S. Pat. No. 5,467,434, a server may include, among other objects, a plurality of queues, corresponded with a plurality of printers and a server process for facilitating transmission of a job (including image data and a set of control instructions) to a selected plurality of printers. In practice, the client transmits the job to a selected one of the queues and the server processor, in turn, sees that the job is transmitted to a corresponding one of the printers associated with the queue. It is understood that each queue can correspond with one or more of the printers.

The following patents also disclose print servers or services appropriate for transmitting/processing jobs within a network: U.S. Pat. No. 5,113,494 to Menendez et al. (Issued: May 12, 1992); U.S. Pat. No. 5,179,637 to Nardozzi (Issued: Jan. 12, 1993); and U.S. Pat. No. 5,220,674 to Morgan et al. (Issued: Jun. 15, 1993).

U.S. Pat. No. 5,113,494 discloses an arrangement in which a plurality of nodes communicate with one another by way of a local area network communication line. In practice, a job can be created at one node, e.g. a scanner node, for transmission to and output at another node, e.g. a printer node.

U.S. Pat. No. 5,179,637 discloses a system for distributing print jobs received from a print image data source among a set of print engines and associated processors. One or more data files containing the information required to print one or more copies of an image are submitted to a scheduler and the scheduler interprets the job control information in the data file(s) for the image and passes the data files(s) to an image processor.

U.S. Pat. No. 5,220,674 discloses a local area print server which functions in cooperation with a plurality of clients and a plurality of printers to facilitate communication between the clients and the printers. More particularly, the local area print server both controls the servicing of printer requests by a printer and, in response to printer requests for resources needed to satisfy a printing request, either provides required resources, or obtains the resources from remote subsystems.

The system of U.S. Pat. No. 5,220,674 is suitable for use with a printing standard referred to as "DPA ISO 10175". An implementation of this standard (in conjunction with "POSIX.7 IEEE 1003.7a") can be found in various available network printing products, such as one of the "Document Centre" printing systems sold by Xerox Corporation. A description of the theory underlying this implementation is provided in further detail immediately below, the description including material excerpted from *Palladium Design Document* (V2.0), published in June, 1991 by the Massachusetts Institute of Technology:

A distributed printing system, developed in accordance with OSI Document Processing Architecture (DPA) ISO/IEC 10175, using the name "Palladium Print System" has been developed at MIT/Project Athena. The Palladium Print System uses the following subsystems to obtain a print service: (1) Print Clients; (2) Print Spoolers; (3) Printer Supervisors; and (4) Printers. This print system is based on a two-level client-server model in which the Printer Spooler and Print Supervisor act as servers. The Print Spooler further acts as a client to the Printer Supervisor, while the Print Client normally uses the Print Spooler as its server. In practice, remote procedure calls are used for communications between clients and servers. Each Printer has its own dedicated Printer Supervisor, the Supervisor communicating data and control information with the Printer in a manner that is suitable for the type of printer being employed.

The following will provide a brief background description of the four major subsystems comprising the Palladium Print System:

A Print Client serves as an agent that (1) accepts user commands, (2) submits requests to print services, (3) receives responses, (4) interprets and displays responses to the user, (5) and transmits the document(s) to be printed. A Print Spooler is a server that accepts operations from Print Clients using a RPC, and schedules print jobs on its Printer Supervisors. In one preferred approach, the Spooler communicates with the Printer Supervisors and uses Palladium operations with the RPC. In this preferred approach, the Print Spooler serves as a client for the Printer Supervisor.

A Printer Supervisor accepts requests from clients, namely, Printer Spoolers, to print a job on a Physical Printer. For those circumstances in which code is multi-threaded, each thread is considered a Printer Supervisor and controls its own Physical Printer. While the Printer Supervisor typically resides on the same machine as the Spooler, it may be installed on a different machine having network connectivity to the machine where the Spooler is located.

A Physical Printer is an actual piece of hardware that has its own Printer Supervisor controlling it, and the queue contains jobs waiting to be printed. Upon finishing or nearly finishing a job, a Printer Supervisor indicates to the Spooler its readiness to accept another print job. In turn, the Spooler scans those queues which feed the Physical Printer and the next job is selected with a scheduling algorithm. The job is then submitted to the Physical Printer by the Printer Supervisor using the ISO DPA Print operation.

A Logical Printer is an abstract entity that users employ to specifically indicate where their job is to be printed and/or what characteristics their job is to possess. Each Logical Printer employs default attributes when attributes have not been provided by a user or Print Client. In accordance with the attributes, a corresponding Spooler assigns a print job to one Queue based, at least in part, on a specified Logical Printer. Essentially, one or more Logical Printers feeds a Queue, while each queue feeds one or more Physical Printers as established by the system administrator of the Spooler.

The system of the present invention particularly facilitates operation within the Client/Spooler areas of the DPA Print Model. The Client is part of the print system that accepts commands, submits requests to print services, receives responses from service providers, interprets and displays responses to the user, and transmits the document(s) to be printed. In practice the Client communicates with service providers, through a predefined set of remote procedure calls (conforming with ISO 10175) and issues requests to a server. In turn, the server may authorize the request and pass it along to the Printer Supervisor, or reject the request and return a status value to the Client. A status value will also be returned to the Client by the server upon completing the request of the Client.

The design of the Client includes:
User Interface,
Application Programmer's Interface,
System Programmer's Interface,
Infrastructure Libraries, and
RPC Stubs and Run-Time Library Operating System.

The Client communicates with Service Providers by way off a RPCchannel.

In one contemplated embodiment of the Palladium Print Spooler, RPC calls are provided from the Client or Supervisor by way of a Request Handler Thread, which Thread works in conjunction with a Dispatcher Thread and/or a Job Transfer Thread, depending on the complexity of a request being handled by the Spooler. The Spooler includes a data base such that if a request requires a simple operation, the Request Thread accesses the data base and completes the operation requested. If, however, the operation required is a complex one, then a sub-thread is fired up. Further details regarding Print Spooler design can be obtained by reference to the *Palladium Design Document*.

It is not uncommon for a client to provide a document which includes conflicts in programming relative to a target printer to which the document is to be transmitted. For example, a client may program a document to be printed on a given stock type (i.e. assign a value to a stock attribute) and that stock type may not be available at the target printer. Accordingly, it is desirable to provide a client with as much capability, with respect to assessing what attributes are available at remote printers as possible. The following patents are devoted to systems which permit the client to assess attributes at remote printers: U.S. Pat. No. 5,129,639 to DeHority (Issued: Jul. 14, 1992); U.S. Pat. No. 5,450,571 to Rosekrans et al. (Issued: Sep. 12, 1995); and U.S. Pat. No. 5,467,434 to Hower, Jr. et al. (Issued: Nov. 14, 1995).

U.S. Pat. No. 5,129,639 is directed toward a control system in which a document is programmed at a client, with an attribute set, and then transmitted to a remote printer for processing. Pursuant to such processing, a determination is made, by reference to the programmed attribute set, as to whether a mismatch exists between such set and the attribute set made available at the remote printer. If a mismatch occurs, the client is provided with an opportunity to revise the document to overcome the mismatch.

U.S. Pat. No. 5,450,571 is directed toward an arrangement in which multiple queues, disposed at a server, are corresponded with multiple target printers. Attributes of each printer are registered with the server and a server ticket is developed to reflect the attributes of all of the multiple target printers. Moreover, each queue is associated with a mask file. Pursuant to operation, a client selects a queue and, in response to such selection, the queue's corresponding mask file is applied to the server ticket. As a result of the application, a ticket or dialog specific to the selected queue (and its associated printer(s)) is created for display at the client.

U.S. Pat. No. 5,467,434 is directed toward an arrangement in which attributes available at printers disposed remotely of a client are organized in sets of decision trees with each tree representing the attribute combinations available at one of the printers. Pursuant to programming a job with an attribute set, the client employs an attribute combination examiner to determine if that programmed attribute set is processable at one of the remote printers. By reference to the combination examiner, the client can program a job with an acceptable attribute set.

The DPA Print Model contemplates the printing of a job including a plurality of documents. This concept is similar, in principle, to a system disclosed by Xerox Corporation in its Viewpoint operating system wherein multiple documents are referenced with a single folder having a folder attribute set. The use of Viewpoint has been extended to the printing area by way of U.S. Pat. No. 5,442,732 to Matysek (Issued: Aug. 15, 1995) in which a print folder, as a whole, may be compiled, with a print driver, so that each of the documents in the print folder can be printed in accordance with the folder attribute set. Further flexibility in job programming is provided by now-allowed U.S. patent application Ser. No. 08/287,315 to Hamilton (Filed: Aug. 8, 1994) in which individual documents of the print folder can be provided with one of several stock or finishing attributes.

In accordance with common practice, when a document is revised by a client to overcome conflicts in programming, as in U.S. Pat. No. 5,129,639, the document is recompiled with a print driver prior to sending the document off for printing. Additionally, recompiling is required when an attribute is added to a document or a document is added to a job. It is understood that this recompiling, which can be time-consuming, may be avoided through use of certain DPA calls, such as a call to add a document to a job currently residing on a corresponding Print Spooler. To do this, however, it has been found that the conventional print driver(s) provided at the client would have to be rewritten for accommodating the use of such DPA call(s). Rewriting conventional print drivers can be both costly and time-consuming. Hence, it would be desirable to provide a system to the Client which permits the Client to make changes relative to a spooled document or job while avoiding the need to recompile the spooled document/job and/or rewrite conventional print drivers.

The present invention is particularly suited for use in a network environment, such as in the context of the world wide web, the internet or the like. Examples of some recent patents relating to network environments of plural remote terminal shared users of networked printers include Xerox Corporation U.S. Pat. Nos. 5,483,653, 5,243,518, 5,226,112, 5,170,340 and 5,287,194. Some patents on this subject by others include U.S. Pat. Nos. 5,113,355, 5,113,494 (originally filed Feb. 27, 1987), 5,181,162, 5,220,674, 5,247, 670; 4,953,080 and 4,821,107. Further by way of background, some of the following Xerox® Corporation U.S. patents also include examples of networked systems with printers: U.S. Pat. Nos. 5,153,577; 5,113,517; 5,072, 412; 5,065,347; 5,008,853; 4,947,345; 4,939,507; 4,937, 036; 4,920,481; 4,914,586; 4,899,136; 4,453,128; 4,063, 220; 4,099,024; 3,958,088; 3,920,895; and 3,597,071. Also noted are IBM Corp. U.S. Pat. Nos. 4,651,278 and 4,623, 244, as well as Canon U.S. Pat. No. 4,760,458 and Jap. Pub. No. 59-63872 published Nov. 4, 1984. Some of these various above patents also disclose multi-functional printing systems.

Some other network system related publications include "Xerox Office Systems Technology" "Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer . . ."; "Xerox System Integration Standard Printing Protocol XSIS 118404", April 1984; "Xerox Integrated Production Publishers Solutions: "Booklet No. " 610P50807" "11/85"; "Printing Protocol-Xerox System Integration Standard"

©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript" Language Reference Manual", Addison-Wesley Co., 1990; "Mastering Novell" Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (Jan. 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart®" systems, first announced Sep. 13, 1990, are also noted.

Current popular commercial published "systems software" with LAN workstation connections include Novell DOS 7.0, "Windows®" NT 3.1, and IBM OS/2 Version 2.1.

All of the references designated in the above Background section are incorporated herein by reference.

SUMMARY OF THE INVENTION

In accordance with one aspect of the present invention, there is disclosed a client subsystem for use with a network printing system including a client communicating with one or more of a plurality of print-related devices by way of a network connection. An electronic document is developed at the client and placed into a printable format with a print driver. The client communicates with a spooler for storing the electronic document in the printable format at the spooler. The electronic document in the printable format includes a set of attributes respectively corresponding with a set of attribute values, the set of attribute values controlling a manner in which the electronic document is to be processed at a selected one of the plurality of print-related devices. The client subsystem includes: a document routing system, communicating with both the print driver and the spooler, for facilitating transmission of the electronic document in the printable format from the print driver to the spooler, wherein the spooler stores the electronic document in the printable format in anticipation of processing the electronic document in the printable format with the selected one of the plurality of print-related devices; and a print assistant, communicating with said document routing system, for changing the set of attribute values, independently of the print driver, when at least a portion of the electronic document in the printable format has been routed to the spooler by said document routing system.

In accordance with another aspect of the present invention, there is disclosed a client subsystem for use with a network printing system including a client communicating with one or more of a plurality of print-related devices by way of a network connection. A first electronic document is developed at the client and placed into a first printable format with a print driver, while a second electronic document is developed at the client and placed into a second printable format with the print driver. The client communicates with a spooler for storing both the first electronic document in the first printable format and the second electronic document in the second printable format at the spooler. The client subsystem includes: a document routing system, communicating with both the print driver and the spooler, for facilitating transmission of the first electronic document in the first printable format from the print driver to the spooler at a first time and for facilitating transmission of the second electronic document in the second printable format from the print driver to the spooler at a second time, wherein the spooler stores both the first electronic document in the first printable format and the second electronic document in the second printable format as a job in anticipation of processing the job with one of the plurality of print-related devices; and a print assistant, communicating with said document routing system, for combining the second electronic document in the second printable format with the first electronic document in the first printable format, independently of the print driver, to form at least a portion of the job.

DESCRIPTION OF ONE OR MORE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
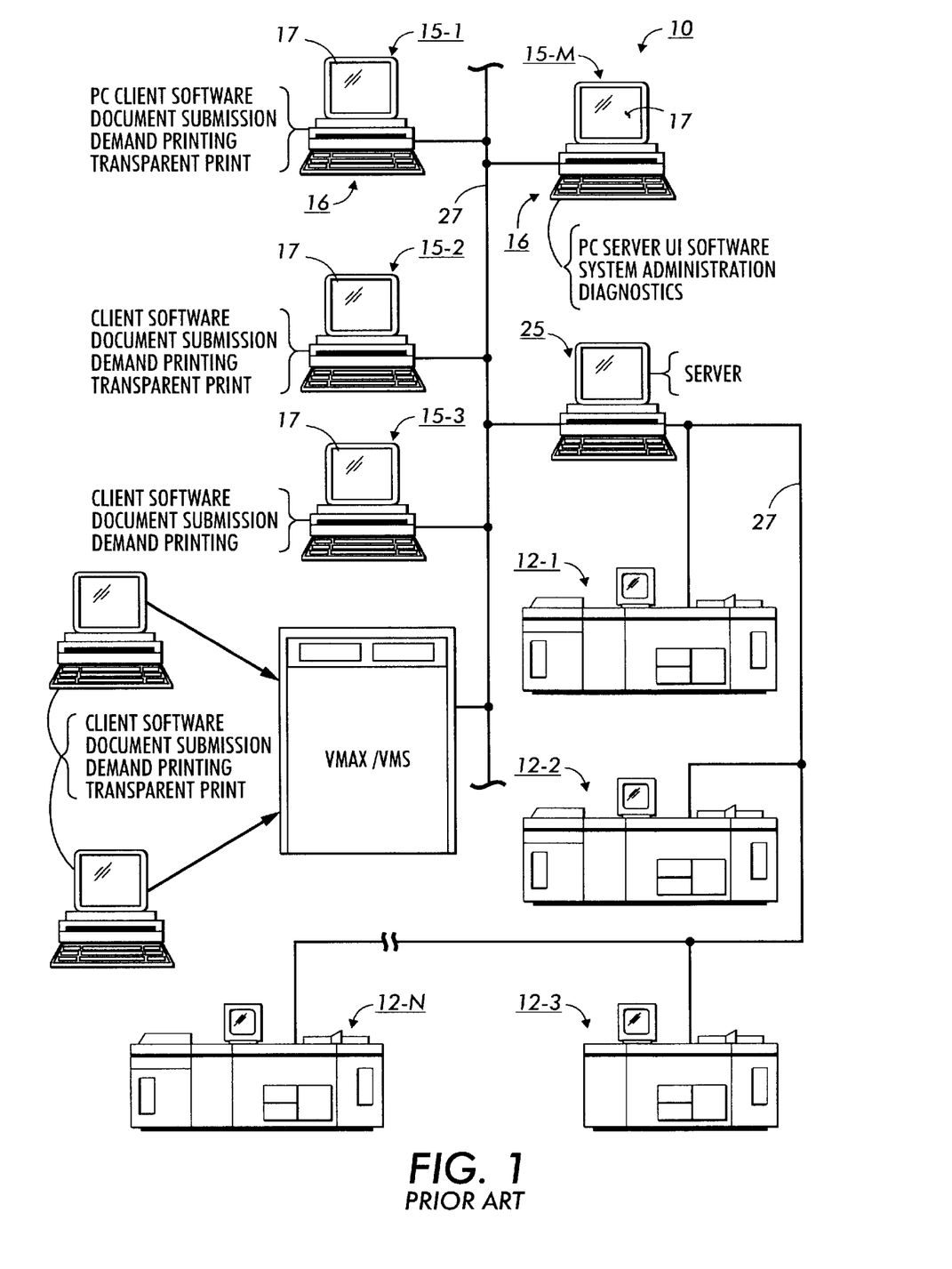
FIG. 1 is a schematic, elevational view of a network printing system.

Referring to Figure. 1, there is shown a network document processing system 10 of the type adapted to incorporate the present invention. Processing system 10 comprises a plurality of printers 12-1, 12-2,12-3, . . . 12-n for processing print jobs and making prints in accordance with the job programming instructions for each job printed. Each of printers 12-1, 12-2,12-3, 12-n may be any suitable printer capable of producing prints on a print media such as paper from video image signals and may, for example, comprise laser printers, ink jet printers, digital copiers, highlight or full process color printers, ionographic printers, combinations of the aforesaid devices, etc. In system 10, where multiple printers are integrated into a network processing system, individual printers typically have different document processing capabilities as will appear. As used herein, printers 12-1, 12-2, 12-3, . . . 12-N include virtual printers of the type disclosed by U.S. Pat. Nos. 5,371,837 and 5,450,571.

System 10 provides print processing for various workstations or clients 15-1,15-2, 15-3, . . . 15-M. Clients 15-1,15-2, 15-3, . . . 15-M, which may be remote and/or on site, are operatively coupled to printers 12-1, 12-2,12-3, 12-N through server 25 as will appear. As will be appreciated, while only one server and a limited number of document processing apparatuses are shown in FIG. 1, the preferred embodiment contemplates the use of as many servers and document processing units as required to meet the demands of the users of the system. Clients provide the electronic documents that are the source of the print jobs and for this purpose individual ones or all of clients 15-1,15-2, 15-3, . . . 15-M may have a document scanner, disk input, keyboard, fax, etc. for generating the electronic documents that comprise the job to be printed. Clients 15-1,15-2, 15-3, . . . 15M have a User Interface (UI) 16 with interactive screen 17 enabling programming selections for documents or jobs to be made. Printers 12-1, 12-2,12-3, . . . 12-N, clients 15-1, 15-2, 15-3, . . . 15-M, and server 25 are operatively interconnected by network or communication channels 27.

Figure 2:
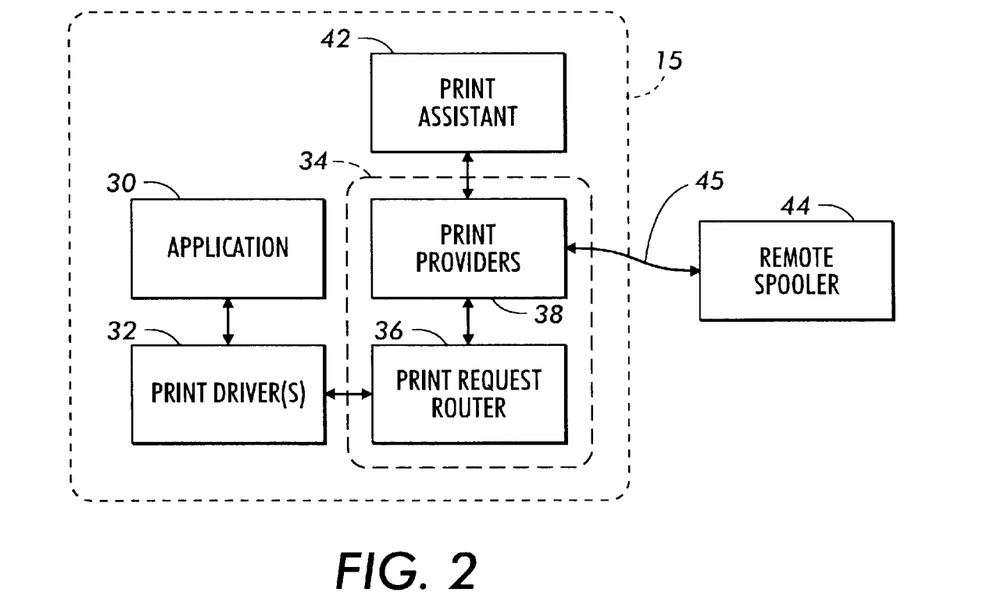
FIG. 2 is a block diagram illustrating one of the clients of FIG. 1 in further detail and including an inventive Print Assistant communicating with a spooler by way of a print provider set.

Referring to FIG. 2, one of clients 15 is described in further detail. As contemplated by the preferred embodiment, an application 30, such as a Microsoft Windows application ("Windows" is a trademark of Microsoft, Inc.) communicates with a set of one or more print drivers 32. As will be recognized, the Application 30 permits a document to be generated in graphic device interface (GDI) format and each print driver is responsible for generating a page description language (PDL) from the GDI. A variety of driver instances may be provided to accommodate for multiple PDLs employed by the printers 12. Through use of one of the print drivers, a job is compiled and communicated to a document routing system 34.

In the illustrated embodiment of FIG. 2, the document routing system includes a print request router 36 in communication with a set of one or more print providers 38. As will be recognized, the Print Provider set typically includes multiple instances of print providers to accommodate for the various types of printers or print-related devices on the network (FIG. 1). In practice, the print request router operates to direct a given document to an appropriate instance of the Print Provider set. Preferably, at least one of the Print Provider instances is written to accommodate for a DPA compliant print device and a print assistant 42, the details of which Print Assistant 42 will appear below, is communicatively coupled with the at least one of the Print Provider instances. It should be appreciated that a tight "coupling" exists between the Print Assistant 42 and one or more instances of the Print Providers 38 so that information (e.g. commands) can flow freely between the Print Assistant and one or more spoolers. As will appear, the Print Providers and the Print Assistant are written in such a manner that at least one instance of the Print Providers can respond to calls from the Print Assistant for controlling state information of one or more documents.

Figure 3:
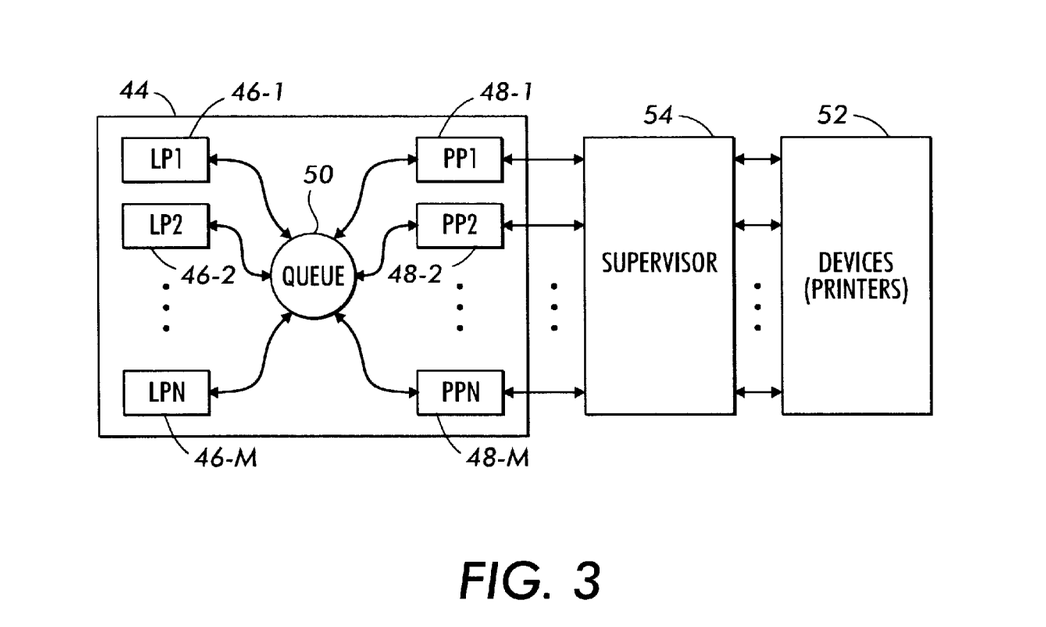
FIG. 3 is a block diagram illustrating a DPA Print Model suitable for use with the network printing system of FIG. 1.

Referring to both FIGS. 2 and 3, the Print Provider set is shown as being communicatively coupled with a spooler 44 by way of a suitable connection, such as an ISO/RPC Wire 45. In one contemplated embodiment of the Spooler 44, a plurality of logical printers 46 and a plurality of physical printer objects 48 communicate with a queue 50. The Physical Printer Objects, which include software necessary to operate Devices 52, act as clients to the Printer Supervisor 54. It will be appreciated that the illustrated embodiment of FIG. 3 could be reconfigured into a wide variety of arrangements without affecting the concept upon which the preferred embodiment is based.

Referring now to FIGS. 2 and 4–8, the functionality of the Print Assistant 42 is described in further detail. As will appear, the following description is considered, in great part, from the perspective of both the Print Providers 38 and the Print Assistant 42. At step 58 the process is initialized through, for example, use of a WIN 32 API call communicated by the Print Driver 32 to the Print Providers 38. As follows from step 60, a job may not currently in the compilation or submission stage. Assuming a document is not currently being submitted, the process proceeds to step 62 (also see FIG. 5) where the Print Assistant is invoked for a selected print-related device (e.g. printer). Pursuant to opening the Print Assistant, a job completion flag is set, at step 64 to "False". By setting this flag to False, the current implementation insures that a job is not made available to a target printer until the user has performed all desired actions on the job. That is, the job cannot be copied to the target printer until it is in an appropriate print ready condition.

If a job is currently being submitted, i.e. PDL is being generated for a document by the Print Driver 32, then, in the preferred embodiment, the Print Assistant 42 is opened automatically, and the job completion flag is set automatically to False. Inevitably the process flows through step 66 so that a document is compiled through use of the Print Driver 32. During compilation of the document a user dialog for the Print Assistant 42 is maintained in an open state. It follows from the decision 68 that, in the illustrated embodiment of FIG. 4, commands for a given document are not executable, through use of the Print Assistant until the given document has been compiled completely. Nonetheless, it is contemplated that, in another embodiment, a variety of job or document attributes, such as results-profiles, job-finishing, job-retention-period, plex or image-shifts, could be modified or supplemented even during compilation of the document.

Figure 4:
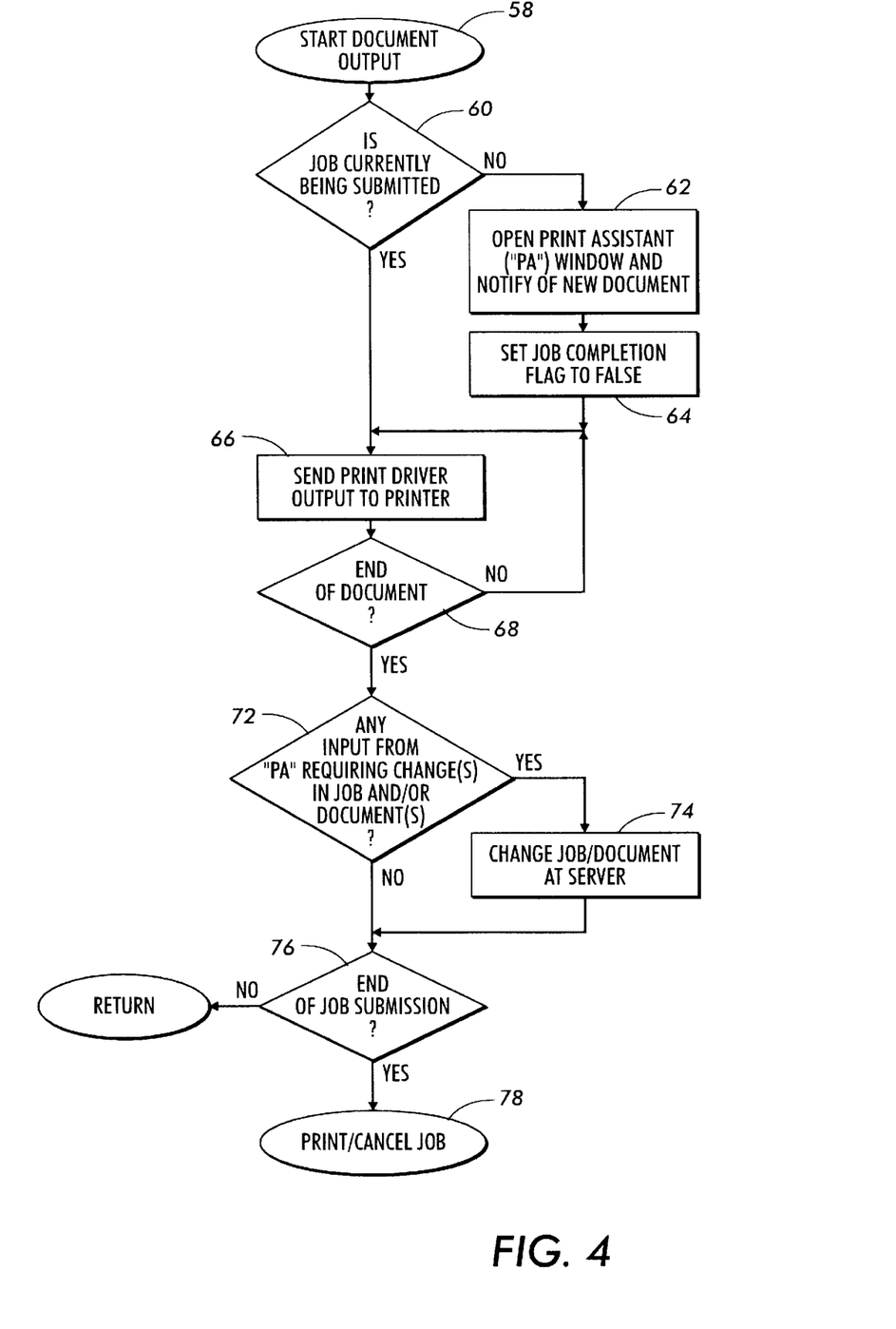
FIG. 4 is a flow diagram demonstrating a manner in which the Print Assistant operates in conjunction with various subsystems of the DPA Print Model of FIG. 3.
Figure 5:
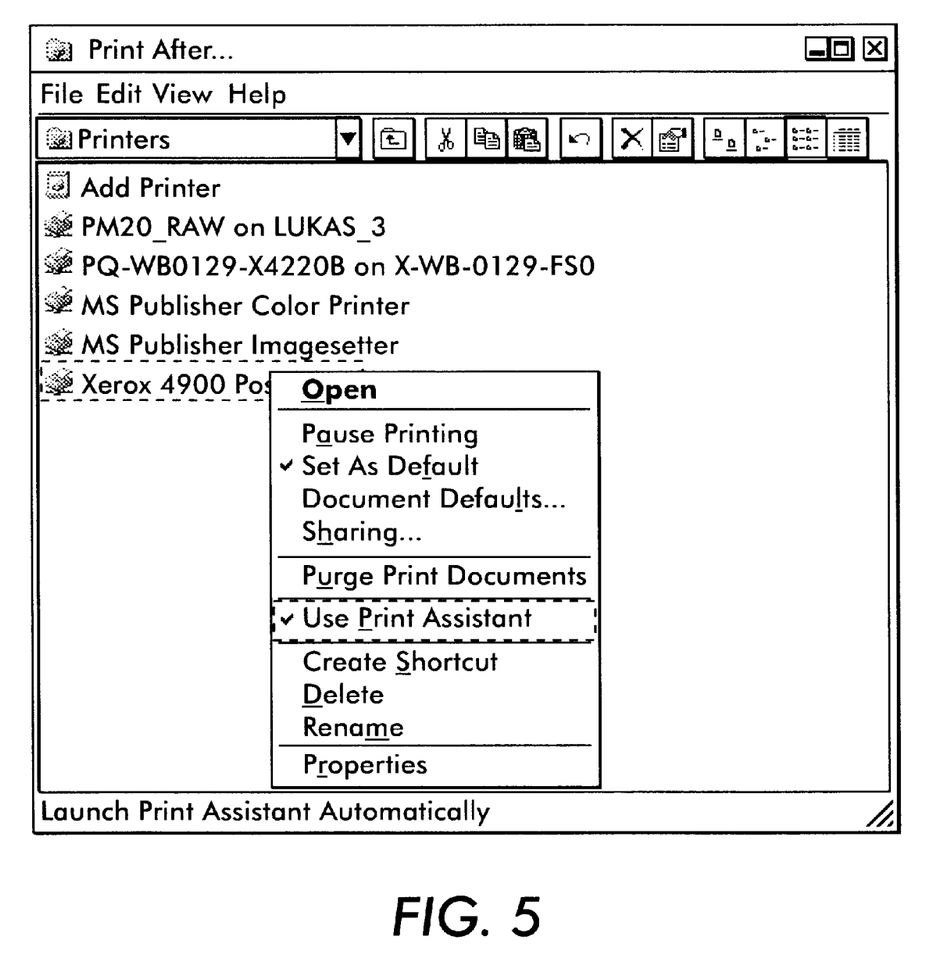
FIG. 5 is an elevational view of a user interface dialog used for invoking the Print Assistant.
Figure 6:
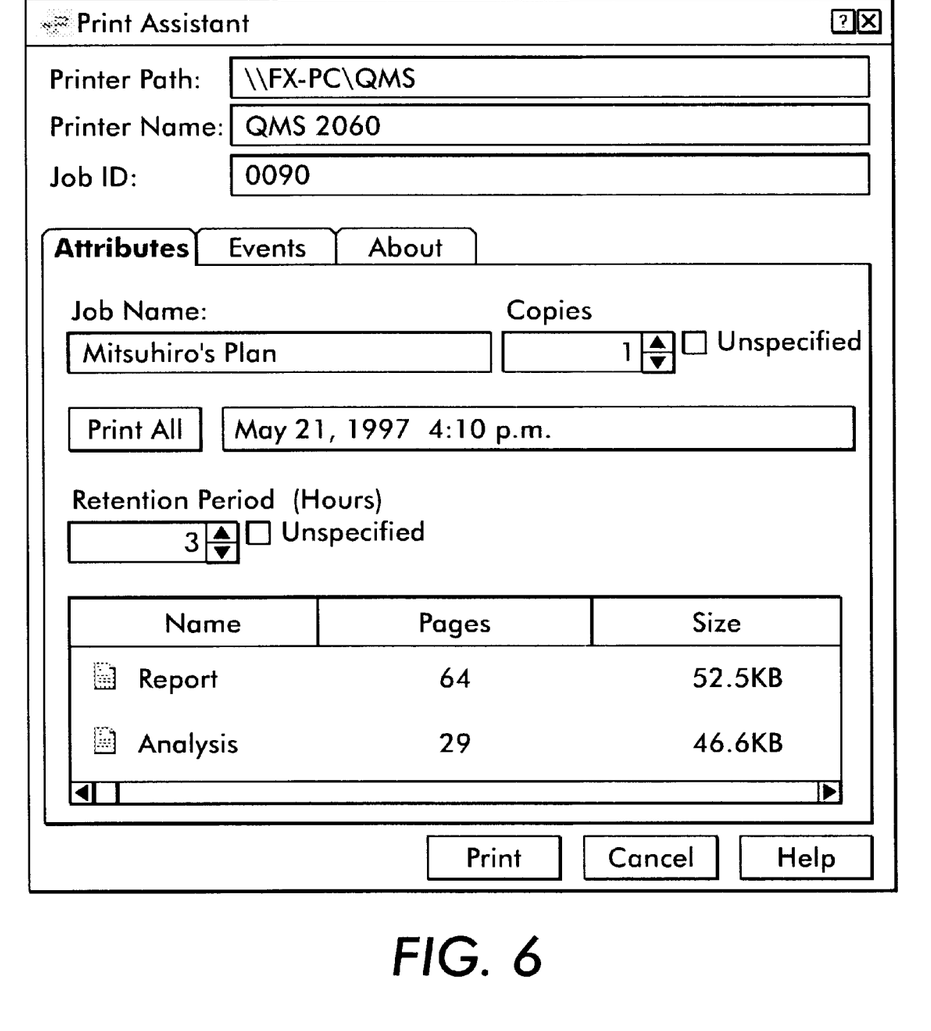
FIG. 6 represents an elevational view of one of the dialogs used by the Print Assistant to change document/job attributes.
Figure 7:
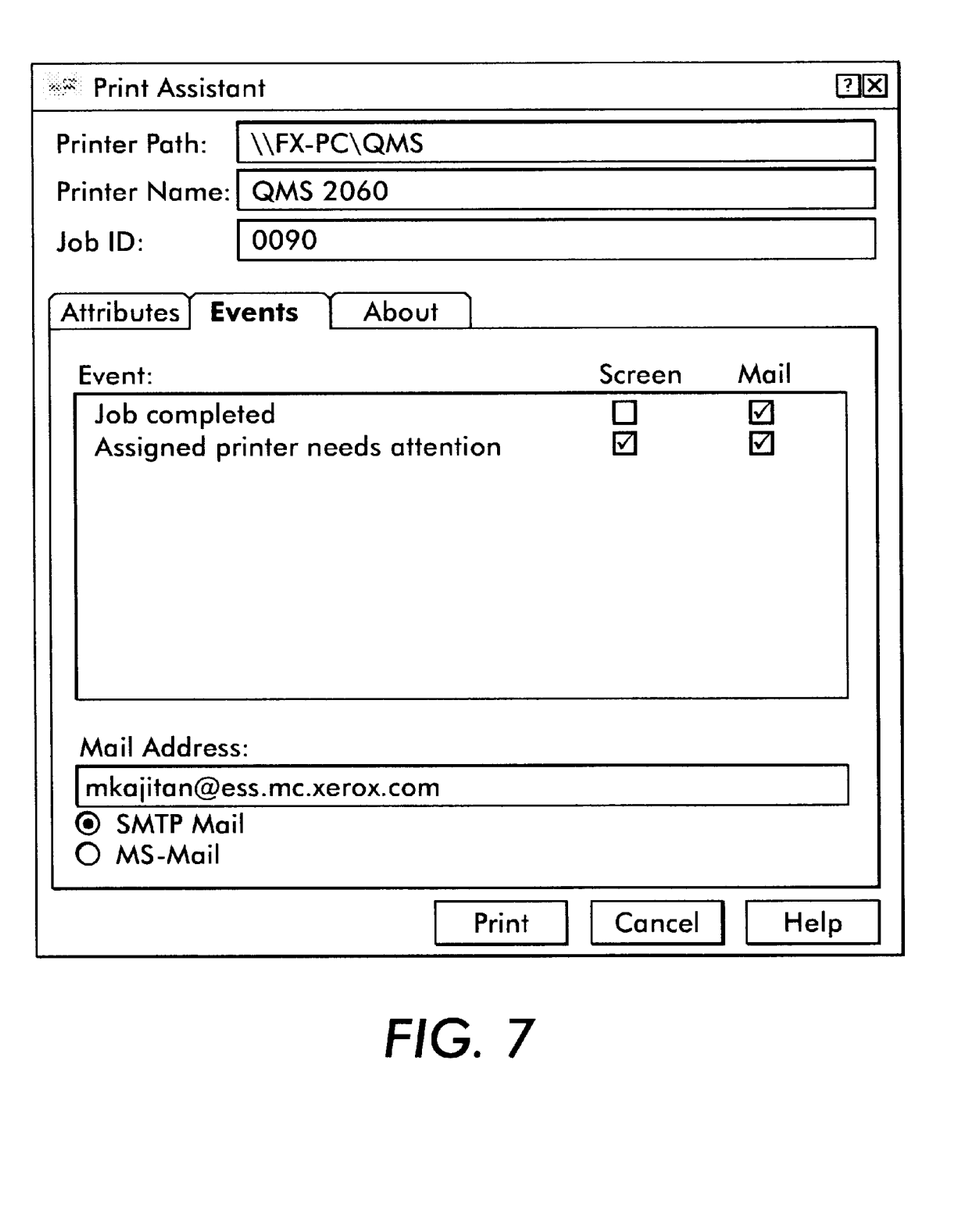
FIG. 7 is an elevational view of a dialog used with the Print Assistant to set events upon execution of which the user is to be notified.

Referring specifically to FIGS. 4 and 6, after the document is compiled, the Client 15 is provided, via step 72, with the opportunity to use Print Assistant 42 for altering attributes of a document or job. As used herein, an attribute refers to a characteristic of a document or job object describing a manner in which the document/job object is to be presented and or processed for output. For example, an attribute may relate to an image processing function, copy count, events (e.g. print time), retention period, stock characteristic, finishing characteristic, and so on. Preferably, a value is assigned to an attribute to provide further specificity to the attribute. In one instance, "plex" might represent an attribute for a document while a multiple bit value might be employed to specify that the plex is to be simplex or duplex. In another instance, "copy count" might represent an attribute for a job while a multiple bit value might be employed to specify the actual number of copies to be made. Additional background information regarding usage of attributes and numerical designations therefor can be obtained by reference to U.S. Pat. No. 5,467,434.

Figure 8:
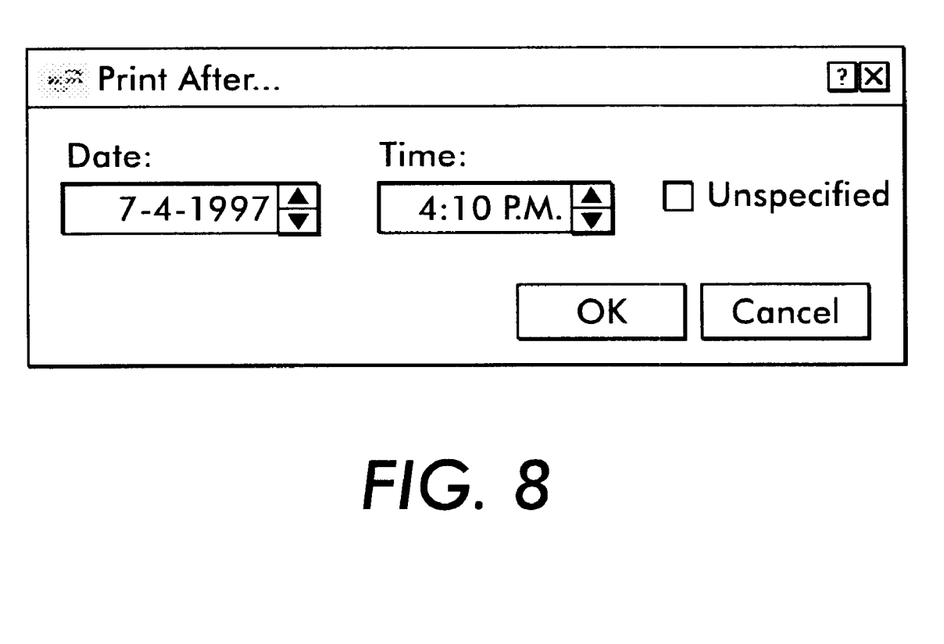
FIG. 8 is an elevational view of a dialog used by the Print Assistant to set a complex document/job attribute.

Changes to a spooled document/job are executed by way of step 74. The changes may, among other changes, include (1) adding one or more attributes to a document/job, (2) modifying one or more attributes of a document/job, and/or (3) adding a document to a job. Additionally, referring to FIG. 7, a document or job may be conditioned with an event. Viewed expansively, an event is a type of to an attribute in that the event constrains a manner in which the document or job is to be processed. One important event related attribute, as shown by FIG. 8, includes setting a "Print After" command for one of the spooled documents or jobs. While this conditional command can be provided readily with the Print Assistant 42, it is believed that considerable reprogramming of a conventional print driver would be required to provide such a command.

After making any suitable changes with the Print Assistant, a Client user is, at step 76, provided with an opportunity to end job submission. In one instance, a user may not wish to end job submission (and invoke a Return) because further document/job changing is required . If, however, job submission is complete, then the process moves to step 78 where the user is permitted to print or cancel the job. In one example of operation, a user is prohibited from executing (e.g. printing) a job unless the job completion flag, pursuant to steps 76 and 78, is set to True.

Numerous features of the above-described embodiment(s) will be appreciated by those skilled in the art:

First, a Print Assistant which permits a client user to change the attributes of a document or job without recompiling the job is provided. The Print Assistant is modular, relative to a corresponding print driver, so that the Print Assistant does not depend on the structure of any particular print driver in performing its attribute changing function. In this way, the functionality of the Print Assistant need not be "baked into" each print driver instance. The modularity of the Print Assistant is useful since it obviates the need to customize conventional print drivers.

Second, the Print Assistant creates a situation in which documents/jobs can be programmed in terms of actual printer configuration without regard to various print driver limitations. That is, commonly a print driver supports a first attribute profile and a target printer supports a second attribute profile. When the second profile is more extensive than the first profile, then a document or job cannot (it is believed) be programmed to exploit all of the features of the target printer without either rewriting the print driver or changing the compiled document/job provided by the print driver. By permitting attribute changes in a document/job "downstream" of the print driver, the Print Assistant allows the document/job to be "upgraded" for use with the target printer without requiring the alteration of a corresponding print driver.

Finally, the Print Assistant facilitates job construction at a remote spooler. In this way the pdl generated by the print driver need not be spooled locally. Additionally, a job need not be recompiled each time a document is added thereto. The ability to change attributes within a job pursuant to the addition of documents thereto provides the client with a high degree of programming flexibility. Moreover, through use of a job indicator flag, a user (or group of users) can be insured that a job will not be executed until the Print Assistant has provided all necessary actions therefor.

We claim:

1. In a network printing system including a client communicating with one or more of a plurality of print-related devices by way of a network connection, an electronic document being developed at the client and being placed into a printable format with a print driver, the client communicating with a spooler for storing the electronic document in the printable format at the spooler, the electronic document in the printable format including a set of attributes respectively corresponding with a set of attribute values, the set of attribute values controlling a manner in which the electronic document is to be processed at a selected one of the plurality of print-related devices, a client subsystem comprising:

a document routing system, communicating with both the print driver and the spooler, for facilitating transmission of the electronic document in the printable format from the print driver to the spooler, wherein the spooler stores the electronic document in the printable format in anticipation of processing the electronic document in the printable format with the selected one of the plurality of print-related devices; and a print assistant, communicating with said document routing system, for changing the set of attribute values, independently of the print driver, when at least a portion of the electronic document in the printable format has been routed to the spooler by said document routing system.

2. The client subsystem of claim 1, wherein said print assistant includes a user dialog which is displayed at the client in response to a portion of the electronic document being placed in the printable format.

3. The client subsystem of claim 1, wherein the spooler is disposed on the network remotely of the client.

4. The client subsystem of claim 1, wherein said changing includes adding an attribute value to the set of attribute values.

5. The client subsystem of claim 4, wherein the attribute value corresponds with an event which triggers processing of the electronic document in the printable format at the selected one of the plurality of print-related devices.

6. The client subsystem of claim 4, in which the print driver supports a first attribute profile and the selected one of the plurality of print-related devices supports a second attribute profile, wherein the second attribute profile includes at least one attribute which is not present in the first attribute profile.

7. The client subsystem of claim 1 wherein said changing includes modifying one of the attribute values in the set of attribute values.

8. In a network printing system including a client communicating with one or more of a plurality of print-related devices by way of a network connection, a first electronic document being developed at the client and being placed into a first printable format with a print driver, a second electronic document being developed at the client and being placed into a second printable format with the print driver, the client communicating with a spooler for storing both the first electronic document in the first printable format and the second electronic document in the second printable format at the spooler, a client subsystem comprising:

a document routing system, communicating with both the print driver and the spooler, for facilitating transmission of the first electronic document in the first printable format from the print driver to the spooler at a first time and for facilitating transmission of the second electronic document in the second printable format from the print driver to the spooler at a second time, wherein the spooler stores both the first electronic document in the first printable format and the second electronic document in the second printable format as a job in anticipation of processing the job with one of the plurality of print-related devices; and a print assistant, communicating with said document routing system, for combining the second electronic document in the second printable format with the first electronic document in the first printable format, independently of the print driver, to form at least a portion of the job.

9. The client subsystem of claim 8, in which the first electronic document in the first printable format includes a set of attributes with each attribute being assigned a value, wherein one of the attribute set is changed with said print assistant.

10. The client subsystem of claim 9, wherein the attribute set is changed by adding an attribute with a value thereto.

11. The client subsystem of claim 9, wherein the attribute set is changed by modifying one of the values in the attribute set.

12. The client subsystem of claim 8, wherein said print assistant includes a user dialog which is displayed at the client in response to a portion of the second electronic document being placed in the second printable format.

13. The client subsystem of claim 8, wherein the spooler is disposed on the network remotely of the client.

14. The client subsystem of claim 8, wherein processing of the job with the one of the plurality of print-related devices is delayed until a job completion indicator is provided to the job.

15. The client subsystem of claim 14, wherein the job completion indicator is provided to the job when the second electronic document in the second printable format is combined with the first electronic document in the first printable format.

* * * * *